United States Patent
Cavanaugh et al.

(10) Patent No.: US 7,754,287 B2
(45) Date of Patent: Jul. 13, 2010

(54) PROCESS FOR FORMING FILLED BEARINGS FROM FLUOROPOLYMER DISPERSIONS STABILIZED WITH ANIONIC POLYELECTROLYTE DISPERSING AGENTS

(75) Inventors: Robert John Cavanaugh, Cincinnati, OH (US); Clay Woodward Jones, Washington, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 367 days.

(21) Appl. No.: 11/804,547

(22) Filed: May 18, 2007

(65) Prior Publication Data

US 2007/0281101 A1 Dec. 6, 2007

Related U.S. Application Data

(60) Provisional application No. 60/809,714, filed on May 31, 2006.

(51) Int. Cl.
*B05D 3/02* (2006.01)
(52) U.S. Cl. .............. 427/384; 427/385.5; 427/388.1; 427/388.4
(58) Field of Classification Search ........................ None
See application file for complete search history.

(56) References Cited

U.S. PATENT DOCUMENTS

| | | | |
|---|---|---|---|
| 2,559,752 A | 7/1951 | Berry | |
| 2,562,118 A | 7/1951 | Osdal | |
| 3,037,953 A | 6/1962 | Marks et al. | |
| 3,055,852 A | 9/1962 | Youse | |
| 3,293,203 A * | 12/1966 | Paulus | 524/88 |
| 3,840,487 A * | 10/1974 | Dyson et al. | 524/316 |
| 3,882,153 A | 5/1975 | Seki et al. | |
| 4,039,713 A * | 8/1977 | Vassiliou | 428/324 |
| 4,049,863 A * | 9/1977 | Vassiliou | 428/324 |
| 4,243,430 A * | 1/1981 | Sperry et al. | 524/432 |
| 4,282,162 A | 8/1981 | Kuhls | |
| 4,369,266 A | 1/1983 | Kuhls et al. | |
| 5,272,186 A | 12/1993 | Jones | |
| 5,464,897 A | 11/1995 | Das et al. | |
| 5,718,947 A * | 2/1998 | Martin et al. | 427/243 |
| 6,153,688 A | 11/2000 | Miura et al. | |
| 6,461,679 B1 * | 10/2002 | McMeekin et al. | 427/369 |
| 6,479,581 B1 | 11/2002 | Ireland et al. | |
| 6,833,403 B1 | 12/2004 | Bladel et al. | |
| 6,956,078 B2 | 10/2005 | Cavanaugh et al. | |
| 2003/0199639 A1 * | 10/2003 | Coates et al. | 525/326.2 |
| 2004/0068036 A1 * | 4/2004 | Halladay et al. | 524/439 |
| 2005/0025977 A1 * | 2/2005 | Adam et al. | 428/422 |
| 2005/0107506 A1 | 5/2005 | Kapeliouchko et al. | |
| 2007/0021551 A1 | 1/2007 | Malvasi et al. | |

FOREIGN PATENT DOCUMENTS

| | | |
|---|---|---|
| EP | 0 724 915 A1 | 8/1996 |
| EP | 0 964 037 A1 | 12/1999 |
| EP | 1 035 166 A1 | 9/2000 |
| EP | 1 676 867 A1 | 7/2006 |
| EP | 1 676 867 B1 | 9/2009 |
| NL | 6514947 A | 5/1966 |

OTHER PUBLICATIONS

Kirk Othmer "Encyclopedia of Chemical Technology", Polymerization Mechanisms and Processes, III Ed., vol. 18, pp. 720-744.

* cited by examiner

*Primary Examiner*—Erma Cameron

(57) ABSTRACT

The present invention provides a process for making a filled fluoropolymer bearing comprising providing an aqueous fluoropolymer dispersion comprising fluoropolymer particles and anionic polyelectrolyte dispersing agent in an amount sufficient for stabilization. The dispersion contains less than about 300 ppm fluorosurfactant based on the weight of the dispersion. The dispersion is coagulated to make a mush and a bearing filler is added to the dispersion prior to or after making the mush. The mush containing bearing filler is applied onto a bearing substrate to produce a coated substrate which is sintered and formed into a bearing.

21 Claims, No Drawings

PROCESS FOR FORMING FILLED BEARINGS FROM FLUOROPOLYMER DISPERSIONS STABILIZED WITH ANIONIC POLYELECTROLYTE DISPERSING AGENTS

FIELD OF INVENTION

The present invention relates to forming filled bearings from stabilized fluoropolymer dispersions with reduced fluorosurfactant content.

BACKGROUND OF THE INVENTION

Fluoropolymers are applied to a wide number of substrates in order to confer release, chemical and heat resistance, corrosion protection, cleanability, low flammability, and weatherability. Coatings of polytetrafluoroethylene (PTFE) homopolymers and modified PTFE provide the highest heat stability among the fluoropolymers, but unlike tetrafluoroethylene (TFE) copolymers, cannot be melt processed to form films and coatings. Therefore, other processes have been developed for applying coatings of PTFE homopolymers and modified PTFE. One such process is dispersion coating which applies the fluoropolymer in dispersion form. Dispersions used in coating processes are usually in a concentrated form and contain a significant quantity of nonionic surfactant, e.g. 6-8 weight percent, as taught in Marks et al., U.S. Pat. No. 3,037,953. Similar dispersions and coating processes are also used for making coatings of melt-processible fluoropolymers.

For some specialized fluoropolymer dispersion applications, common nonionic surfactants such as alkyl phenol ethoxylates or aliphatic alcohols ethoxylates for stabilization are unsuitable. One such application is the manufacture of filled fluoropolymer bearings where anionic surfactants have been used for stabilization of dispersions during handling and transportation. To prepare the fluoropolymer for bearing manufacture, an aluminum salt, usually the nitrate or sulfate, is added which reacts with an anionic surfactant such as sodium lauryl sulfate to form insoluble aluminum lauryl sulfate. The PTFE is thereby coagulated due to the loss of surfactant, forming a thick mixture referred to as a "mush". The end user adds a suitable filler such as lead powder, molybdenum disulfide or other suitable filler for the particular bearing application either prior to or after formation of the mush. A small amount of non-ionic surfactant or a water immiscible organic, usually toluene, is typically added to help wet the filler and control the viscosity of the "mush". The mush is calendared onto metal strips and sintered to form a coated substrate which is formed into a bearing. Filled fluoropolymer bearing, due to lubricating properties of the PTFE and/or fillers, can be used in dry un-lubricated form, i.e., without lubricating oil or grease. Typical dispersions stabilized with nonionic surfactants are much more difficult to coagulate and do not form acceptable mushes for use in filled fluoropolymer bearing manufacture.

Fluorosurfactants are typically used as an ingredient in the dispersion polymerization of fluoropolymers, the fluorosurfactants functioning as a non-telogenic dispersing agent. For example, an early description of this use of fluorosurfactants is found in U.S. Pat. No. 2,559,752 to Berry. However because of environmental concerns and because fluorosurfactants are expensive, processes have been developed for reducing and recovering fluorosurfactant from aqueous fluoropolymer dispersions.

One common method is to remove fluorosurfactant by adsorption onto an ion exchange resin as taught in U.S. Pat. No. 3,882,153 (Seki et al) and U.S. Pat. No. 4,282,162 (Kuhis) and U.S. Pat. No. 6,833,403 (Bladel et al.) For effective removal, such dispersions are stabilized with a nonionic surfactant, such as alkyl phenol ethoxylates or aliphatic alcohol ethoxylates as disclosed in U.S. Pat. No. 3,037,953 to Marks et al.; U.S. Pat. No. 6,153,688 to Miura et al.; and U.S. Pat. No. 6,956,078 to Cavanaugh et al. Dispersions stabilized with nonionic surfactant are used since removal of the fluorosurfactant without nonionic surfactant being present generally results in coagulation of the dispersion.

If it is attempted to use an anion exchange process for the fluoropolymer dispersions discussed above that are stabilized with an anionic hydrocarbon surfactant such as sodium lauryl sulfate instead of nonionic surfactant, the anionic hydrocarbon surfactant will be removed from the dispersion together with the fluorosurfactant causing coagulation of the dispersion.

BRIEF SUMMARY OF THE INVENTION

The present invention provides a process for making a filled fluoropolymer bearing comprising providing an aqueous fluoropolymer dispersion comprising fluoropolymer particles and anionic polyelectrolyte dispersing agent in an amount sufficient for stabilization. The dispersion contains less than about 300 ppm fluorosurfactant based on the weight of the dispersion. The dispersion is coagulated to make a mush and a bearing filler is added to the dispersion prior to or after making the mush. The mush containing bearing filler is applied onto a bearing substrate to produce a coated substrate which is sintered and formed into a bearing.

In a preferred form of the invention, the aqueous fluoropolymer dispersion is substantially free of nonionic surfactant.

DETAILED DESCRIPTION OF THE INVENTION

Fluoropolymers

The aqueous fluoropolymer dispersion employed in accordance with the present invention is made by dispersion polymerization (also known as emulsion polymerization). Fluoropolymer dispersions are comprised of particles of polymers made from monomers wherein at least one of the monomers contains fluorine. The fluoropolymer of the particles of the aqueous dispersions of this invention is independently selected from the group of polymers and copolymers of trifluoroethylene, hexafluoropropylene, monochlorotrifluoroethylene, dichlorodifluoroethylene, tetrafluoroethylene, perfluoroalkyl ethylene monomers, perfluoro(alkyl vinyl ether) monomers, vinylidene fluoride, and vinyl fluoride.

Preferred fluoropolymer particles used in the dispersion employed in this invention are non-melt-processible particles of polytetrafluoroethylene (PTFE) including modified PTFE which is not melt-processible. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 wt %, more preferably less than 0.5 wt %. A minimum amount of at least about 0.05 wt % is preferably used to have significant effect. The modified PTFE preferably contains a comonomer modifier which improves film forming capability during baking (fusing), such as perfluoroolefin, notably hexafluoropropylene (HFP) or perfluoro(alkyl vinyl) ether (PAVE), where the alkyl group contains 1 to 5 carbon atoms, with perfluoro (ethyl vinyl) ether (PEVE) and perfluoro(propyl vinyl) ether (PPVE) being preferred. Chlorotrifluoroethylene (CTFE), perfluorobutyl ethylene (PFBE), or other monomer that introduces bulky side groups into the molecule are also included. In this preferred form of the invention, the PTFE typically has a melt creep viscosity of at least $1 \times 10^9$ Pa·s. The resins in the dispersion used in this form of the invention when isolated and dried are thus non-melt-processible.

By non-melt-processible, it is meant that no melt flow is detected when tested by the standard melt viscosity determining procedure for melt-processible polymers. This test is according to ASTM D-1238-00 modified as follows: The cylinder, orifice and piston tip are made of corrosion resistant alloy, Haynes Stellite 19, made by Haynes Stellite Co. The 5.0 g sample is charged to the 9.53 mm (0.375 inch) inside diameter cylinder which is maintained at 372° C. Five minutes after the sample is charged to the cylinder, it is extruded through a 2.10 mm (0.0825 inch diameter), 8.00 mm (0.315 inch) long square-edge orifice under a load (piston plus weight) of 5000 grams. This corresponds to a shear stress of 44.8 KPa (6.5 pounds per square inch). No melt extrudate is observed.

In one preferred embodiment, the fluoropolymer particles in the dispersion used in this invention comprise a core of high molecular weight, polytetrafluoroethylene (PTFE) and a shell of lower molecular weight polytetrafluoroethylene or modified polytetrafluoroethylene.

The preferred non-melt-processible PTFE or modified PTFE have a standard specific gravity (SSG) of about 2.13 to about 2.50. Preferably, the SSG is less than about 2.40, more preferably less than about 2.30, and most preferably less than about 2.25. The SSG is generally inversely proportional to the molecular weight of PTFE or modified PTFE.

The fluoropolymer particles in the dispersion used in this invention have a number average particle size of about 10 nm to about 400 nm, preferably, about 100 nm to about 350 nm.

A typical process for the aqueous dispersion polymerization of preferred PTFE polymer is a process wherein TFE vapor is fed to a heated reactor containing fluorosurfactants, paraffin wax and deionized water. A chain transfer agent may also be added if it is desired to reduce the molecular weight of the PTFE. A free-radical initiator solution is added and, as the polymerization proceeds, additional TFE is added to maintain the pressure. The exothermic heat of reaction is removed by circulating cooling water through the reactor jacket. After several hours, the feeds are stopped, the reactor is vented and purged with nitrogen, and the raw dispersion in the vessel is transferred to a cooling vessel. Paraffin wax is removed and the dispersion is isolated and stabilized with dispersing agent.

The fluorosurfactant used in the manufacture of the dispersion is a non-telogenic, anionic dispersing agent, soluble in water and comprising an anionic hydrophilic group and a hydrophobic portion. Preferably, the hydrophobic portion is an aliphatic fluoroalkyl group containing at least four carbon atoms and bearing fluorine atoms and having no more than two carbon atoms not bearing fluorine atoms adjacent to the hydrophilic group. These fluorosurfactants are used as a polymerization aid for dispersing and, because they do not chain transfer, they do not cause formation of polymer with undesirable short chain length. An extensive list of suitable fluorosurfactants is disclosed in U.S. Pat. No. 2,559,752 to Berry. Preferably, the fluorosurfactant is a perfluorinated carboxylic or sulfonic acid having 6-10 carbon atoms and is typically used in salt form. Suitable fluorosurfactants are ammonium perfluorocarboxylates, e.g., ammonium perfluorocaprylate or ammonium perfluorooctanoate. The fluorosurfactants are usually present in the amount of 0.02 to 1 wt % with respect to the amount of polymer formed. The fluorinated surfactant is used to aid the polymerization process but the amount remaining in the dispersion is significantly reduced as will be explained below.

The initiators preferably used to make the dispersion are free radical initiators. They may be those having a relatively long half-life, preferably persulfates, e.g., ammonium persulfate or potassium persulfate. To shorten the half-life of persulfate initiators, reducing agents such as ammonium bisulfite or sodium metabisulfite, with or without metal catalysis salts such as Fe (III), can be used. Alternatively, short half-life initiators such as potassium permanganate/ oxalic acid can be used.

In addition to the long half-life persulfate initiators, small amounts of short chain dicarboxylic acids such as succinic acid or initiators that produce succinic acid such as disuccinic acid peroxide (DSP) may be also be added in order to reduce coagulum To produce dispersion with low fluorosurfactant content as described below, sufficient anionic polyelectrolyte dispersing agent as is described in more detail hereinafter is added to prevent coagulation of the dispersion when the fluorosurfactant content is reduced.

The dispersion can concentrated if desired as will be described below although bearing manufacture is often performed using dispersions which are not concentrated and it may be desirable to dilute as—polymerized, high solids dispersions. Solids contents of dispersions preferably used in the process are about 25 to about 70 wt %. If used, the concentrated aqueous dispersion has a fluoropolymer solids content of at least about 35 wt %, preferably at least about 40 wt %, and more preferably at least about 45 wt %.

The aqueous dispersion used in accordance with the invention is preferably substantially free of nonionic surfactants. "Substantially free" means that the dispersion contains either no nonionic surfactant or so little nonionic surfactant that such nonionic surfactant will not interfere with end-use applications. Preferably, the dispersion contains less than about 2 wt % of nonionic surfactant based on dispersion weight, preferably less than about 1 wt %, more preferably less than about 0.5 wt % and especially less than 0.1 wt %.

Dispersing Agents

Fluoropolymer dispersions are typically stabilized with surfactants. A surfactant has a hydrophilic portion and a hydrophobic portion on the same molecule. These can be either cationic, nonionic or anionic. A typical cationic surfactant has a positively charged hydrophilic portion such as an alkylated ammonium halide and a hydrophobic portion such as a long chain fatty acid. An anionic surfactant has a negatively charged hydrophilic portion such as a carboxylate or sulfate salt and a long chain hydrocarbon portion as the hydrophobic portion. A nonionic surfactant does not contain a charged group but has a hydrophobic portion that is typically a long chain hydrocarbon similar to the other two types of surfactants. The hydrophilic portion of the nonionic surfactant typically contains water soluble functionality such as a chain of ethylene ether derived from polymerization with ethylene oxide. Water solubility is due to hydrogen bonding of the ether oxygen atoms with protons from the water. Surfactants stabilize polymer particles by coating the particles with the hydrophobic portion of the surfactant oriented towards the particle and the hydrophilic portion of the surfactant in the water phase. In the case of charged surfactants, some stability is also due to repulsion of the electrical charges between particles. Surfactants typically reduce surface tension significantly and allow better wetting of surfaces with the dispersion. In contrast, anionic polyelectrolyte dispersing agents are employed in dispersions in accordance with the invention for stabilization. These dispersing agents are different from surfactants in that they do not contain distinct hydrophilic and hydrophobic portions. It is believed that stabilization of fluoropolymer dispersions occurs when the anionic polyelectrolyte dispersing agents coat the fluoropolymer particles. The anionic groups carried on the dispersing agents increase the surface charge on the particle and confer stability by repulsion of the electrical charges between particles. Unlike surfactants, these dispersing agents typically have little if any significant effect on surface tension of the dispersion. The surface tension of the dispersion containing anionic polyelectrolyte dispersing agents remains high unless surfactants are added to alter wetting properties, for viscosity control, improve stability, etc. Nonionic surfactants, substantially reduce the surface tension of the aqueous solutions. In contrast the polyelectrolytes are often used as flocculating agents of colloidal dispersions whereas surfactants are normally used to stabilize colloidal dispersions. Surface tension of a preferred dispersion used in accordance with the present invention is greater than about 35 dyne/cm at 25° C., preferably greater than about 40 dyne/cm, still more preferably greater than about 45 dyne/cm.

The anionic polyelectrolyte dispersing agents employed in accordance with dispersions for the process of the present invention are preferably anionic polymers, having a linear or branched structure, with anionic groups distributed along the polymeric chain, optionally present also in the chain end groups. The polyelectrolytes preferably have an equivalent weight, defined as molecular weight/number of anionic groups present in the polyelectrolyte, greater than about 150, preferably greater than about 200, still more preferably greater than about 250. Generally the equivalent weight of the anionic polyelectrolyte dispersing agents usable in the process of the present invention is less than about 50,000, preferably less than about 10,000, more preferably less than about 3,000, still more preferably less than about 1,500.

The number average molecular weight of the anionic polyelectrolyte dispersing agent is preferably at least about 500, more preferably in the range of about 500 to about 100,000. More preferably, the molecular weight is at least about 1,000. Especially preferred embodiments have a molecular weight of about 2,000 to about 100,000 and preferably 5,000 to about 20,000.

The anionic polyelectrolyte dispersing agents usable in the process according to the present invention preferably contain in the molecule a number of anionic functional groups higher than or equal to 2, more preferably greater than or equal to 5. The anionic groups present in the molecule of the anionic polyelectrolyte agents are preferably selected from carboxylates, sulphates, sulphonates, phosphates, phosphonates, are more preferably carboxylates, sulphates, sulphonates, and still more preferably are carboxylates. Generally, the anionic polyelectrolyte dispersing agents do not contain fluorine atoms.

Preferably, the anionic polyelectrolyte dispersing agents used according to the present invention are selected from anionic homopolymers or copolymers of monomers selected from acrylic or vinyl monomers which preferably provide a number of anionic groups as mentioned above give the equivalent weight as defined above. Preferably, acrylic monomers are selected from (meth)acrylamide, (meth)acrylic acid in the form of the corresponding salts, (meth)acrylonitrile, linear or branched $C_1$-$C_4$ hydroxyesters of the (meth)acrylic acid, $C_1$-$C_{12}$ alkyl(meth)acrylates, wherein the alkyl can be linear or branched, compounds of the following general formula:

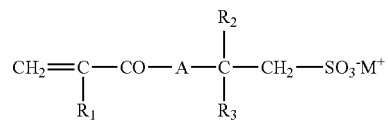

wherein: $R_1$ is H or $CH_3$; $R_2$ and $R_3$, equal or different, are H or $C_1$-$C_8$ alkyl, optionally branched; M is an alkaline or alkaline-earth metal or ammonium and A is NH, O or $NCH_3$.

Among the vinyl monomers which can provide anionic polyelectrolytes for use in accordance with the present invention, vinylaromatic monomers can be used, preferably styrene and its derivatives obtained by substituting one or more hydrogen atoms of the aromatic ring with a hydroxyl or a methyl and/or of vinyl with a methyl, for example, alpha-methylstyrene; $C_1$-$C_{12}$ alkyl vinylethers, such as methyl-, ethyl-, n-propyl-, isopropyl-, n-butyl-, isobutyl- and 2-ethylhexyl-vinyl ether; and vinyl esters of $C_1$-$C_{18}$ aliphatic monocarboxylic acids, such as vinyl acetate, vinyl propionate, vinyl butyrate, vinyl-2-ethyl-hexanoate, and vinyl stearate.

Homopolymers or copolymers of one or more monomers selected from acrylic or vinyl monomers are obtainable by aqueous suspension polymerization by radical or ionic addition, according to well known methods of the prior art. See for example Kirk Othmer "Encyclopedia of Chemical Technology", III Ed., vol. 18, pages 720-744. In case of radical polymerization in aqueous suspension, as radical initiators, those soluble in monomers are preferably used and furthermore suspending agents, surfactants are used.

As radical initiators, aliphatic and aromatic peroxides are for example used, as for example t-butylperoxy-2-ethylhexanoate, dibenzoylperoxide, benzoylperoxide, laurylperoxide, t-butylperoxydiethylacetate or unstable azocompounds as for example azodiisobutyronitrile. In the monomeric mixture also a chain transfer agent can optionally be used. Mercaptan compounds, as mercaptoethanol, mercaptopropanol, mercaptobutanol, mercaptoacetic acid, mercaptopropionic acid, butylmercaptan, n-dodecylmercaptan, can for example be mentioned. The polymerization temperatures are those at which there is the initiator decomposition, and are generally from about 50° C. to about 120° C. For the suspending agents see for example EP 457,356.

Other usable anionic polyelectrolyte dispersing agents are polyamic acids, preferably aromatic polyamic acids or polyamidoamic acids. Examples of repeating units of these polymers are:

amido-amic acid:

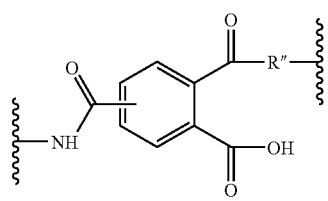

amidoimidic unit:

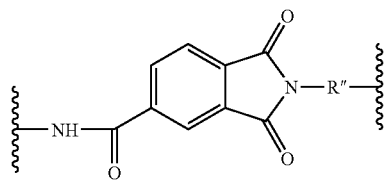

wherein $R^{II}$ is a divalent arylene radical. See, for example, U.S. Pat. No. 6,479,581 which describes preparation of such polymers.

Other usable anionic polyelectrolyte dispersing agents are carboxyalkyl celluloses, wherein the alkyl comprises from 1 to 5 carbon atoms, preferably from 1 to 3, for example carboxymethylcellulose.

The polyelectrolyte dispersing agents usable in accordance with the invention are, for example, those sold under the trademarks Craymul® 8212 (Cray Valley), Torlon® A130 (Solvay Advanced Polymers), Torlon® A150 (Solvay Advanced Polymers), Elvacite® 2669 and Elvacite® 2776 (Lucite International), and Joncryl® DFC 3025 (Johnson Polymer).

Anionic polyelectrolytes for used in accordance with the present invention are generally soluble in water. Co-solvents miscible with water such as alcohols, e.g., isopropyl alcohol, ketones, e.g., N-methylpyrrolidone, can optionally be added.

The anionic polyelectrolyte dispersing agent is added in an amount sufficient for stabilization. Preferably, it is added in an amount of about 0.03 to about 10 wt %, more preferably about 0.1 wt % to about 10 wt %, still more preferably from about 0.2 wt % to about 5 wt %, and still more preferably from about 0.5 wt % to about 3 wt % in per cent by weight based on the weight of the fluoropolymer solids. The polyelectrolyte amount generally depends on the type of polyelectrolyte used. One skilled in the art is easily able determine an appropriate amount sufficient to confer the stability desired.

One class of preferred anionic dispersing agents are acrylic copolymers, more preferably acrylic copolymer dispersing agents described as being hydrophobic acrylic copolymers. Examples of polymer of this type are sold under the trademarks TAMOL® 681, TAMOL® 2001, TAMOL® 165A and TAMOL® 731A sold by Rohm and Haas. Such dispersing agents are known for use in acrylic-based paints to prevent agglomeration of pigments but they are not known for use in fluoropolymer dispersions. A preferred acrylic copolymer dispersing agent for use in this invention comprises methacrylic acid/butyl methacrylate copolymer. More preferably the methacrylic acid/butyl methacrylate copolymer comprises about 30 to about 50 mol % methacrylic acid units and about 50 to about 70 mol % butyl methacrylate units. In embodiments of the invention employing this type of acrylic copolymer anionic polyelectrolyte, amounts acrylic copolymer of about 0.5 wt % to about 5.5 wt % based on the weight of fluoropolymer solids have been found to be especially useful. Percentages of the acrylic copolymer dispersing agent are based on active ingredients.

A preferred acrylic copolymer dispersing agent for this invention has a molecular weight of about 2,000 to about 100,000 and more preferably has a molecular weight of about 5,000 to about 20,000.

Although the acrylic copolymer dispersing agent may be supplied in acid form, it is employed in salt form in the fluoropolymer dispersions of the invention for effective stabilization. Although various salt forms can be used, a preferred form of the acrylic copolymer dispersing agent is in the form of an ammonium salt so that it does not introduce extraneous cations into the dispersion. For the acrylic copolymer dispersing agent to be predominantly in salt form and soluble in water, the pH of the fluoropolymer dispersion is preferably at least about 9, more preferably at least about 9.5.

Dispersion Shear Stability—Gel Time

The dispersion used in the process of the invention preferably has a Gel Time of at least about 100 seconds as determined by the Gel Time test described in the Test Methods of this application. Gel Time is a measurement of resistance of the dispersion to coagulation under high shear conditions and thus is an indicator of the stability of the dispersion during processing which subjects the dispersion to shear. Although affected by a variety of factors including solids content, pH, molecular weight of the polymer, polymer particle morphology, other materials in the dispersion, etc., a Gel Time of at least 100 indicates that the anionic polyelectrolyte dispersing agent is functioning to stabilize the polymer sufficiently for normal handling and processing, e.g., is sufficiently stabilized for fluorosurfactant removal in an anion exchange column. More preferably, the Gel Time is at least about 300 seconds, even more preferably at least about 500 seconds, even more preferably at least about 1000 seconds, and most preferably at least about 1500 seconds. A preferred range of Gel Time provided by the present invention is about 100 seconds to about 2000 seconds. Preferably, the dispersion used has the Gel Times as indicated above with the dispersion containing less than about 300 ppm fluorosurfactant based on the weight of the dispersion. Preferably, the Gel Times described above are observed when the fluorosurfactant content is less than about 100 ppm, most preferably less than about 50 ppm.

Hydrophobic acrylic copolymer anionic polyelectrolytes described above are especially useful in accordance with the invention for providing desirable gel times.

Fluorosurfactant Reduction

For use in the process of the invention, the fluorosurfactant content of aqueous fluoropolymer dispersion is reduced to less than about 300 ppm based on the weight of the dispersion. Preferably, the fluorosurfactant content is less than about 100 ppm, more preferably less than about 50 ppm.

The fluorosurfactant content of the dispersion stabilized with the anionic polyelectrolyte dispersing agent can be reduced by any of a variety of procedures as known in the art. In the preferred embodiment of the present invention, the fluorosurfactant is removed by adsorption onto an anion exchange resin. Contacting of the dispersion with anion exchange resin is preferably performed before concentration especially when a preferred concentration method is employed using the addition of an acrylic polymer with high acid content described in U.S. Pat. No. 5,272,186 to Jones because the acrylic polymer with high acid content may be adsorbed onto the anion exchange resin.

Any of a variety of techniques which bring the dispersion in contact with the anion exchange resin can be used to carry out ion exchange of the process. For example, the process can be carried out by addition of ion exchange resin bead to the dispersion in a stirred tank, in which a slurry of the dispersion and resin is formed, followed by separation of dispersion from the anion exchange resin beads by filtration. Another suitable method is to pass the dispersion through a fixed bed of anion exchange resin instead of using a stirred tank. Flow can be upward or downward through the bed and no separate separation step is needed since the resin remains in the fixed bed.

The contacting of the dispersion is performed at a temperature which is sufficiently high to facilitate the rate of ion exchange and to reduce the viscosity of the dispersion but being below a temperature at which the resin degrades at a detrimentally high rate or a viscosity increase in observed. Upper treatment temperature will vary with the type of polymer and nonionic surfactant employed. Typically, temperatures will be between 20° C. and 80° C.

The fluorosurfactant can be recovered from the anion exchange resin if desired or the resin with the fluorosurfactant can be disposed of in an environmentally acceptable method, e.g., by incineration. If it is desired to recover the fluorosurfactant, the fluorosurfactant may be removed from resin by elution. Elution of fluorosurfactant adsorbed on the anion exchange resin is readily achieved by use of ammonia solution as demonstrated by Seki in U.S. Pat. No. 3,882,153, by a mixture of dilute mineral acid with organic solvent (e.g., HCl/ethanol) as demonstrated by Kuhls in U.S. Pat. No. 4,282,162, or by strong mineral acids such as sulfuric acid and nitric, transferring the adsorbed fluorinated carboxylic acid to the eluent. The fluorosurfactant in the eluent in high concentration can easily be recovered in the form of a pure acid or in the form of salts by common methods such as acid-deposition, salting out, and other methods of concentration, etc.

Ion Exchange Resins

The ion exchange resins for use in reducing the fluorosurfactant content of the aqueous dispersion include anionic resins but can also include other resin types such as cationic resins, e.g., in a mixed bed. The anionic resins employed can be either strongly basic or weakly basic. Suitable weakly basic anion exchange resins contain primary, secondary amine, or tertiary amine groups. Suitable strongly basic anion exchange resin contain quaternary ammonium groups. Although weakly basic resins are useful because they can be regenerated more easily, strongly basis resins are preferred when it is desired to reduce fluorosurfactant to very low levels and for high utilization of the resin. Strongly basic ion exchange resins also have the advantage of less sensitivity to the pH of the media. Strong base anion exchange resins have an associated counter ion and are typically available in chloride or hydroxide form but are readily converted to other forms if desired. Anion exchange resins with hydroxide, chloride, sulfate, and nitrate can be used for the removal of the fluorosurfactant but anion exchange resins in the form of hydroxide are preferred to prevent the introduction of additional anions and to increase pH during anion exchange because a high pH, i.e., greater than 9, is desirable in the product prior to shipping to inhibit bacterial growth. Examples of suitable commercially-available strong base anion exchange resins with quaternary ammonium groups with a trimethylamine moiety include DOWEX® 550A, US Filter A464-OH, SYBRON M-500-OH, SYBRON ASB1-OH, PUROLITE A-500-OH, Itochu TSA 1200, AMBERLITE® IR 402. Examples of suitable commercially-available strong base anion exchange resins with quaternary ammonium groups with a dimethyl ethanol amine moiety include US Filter A244-OH, AMBERLITE® 410, DOWEX® MARATHON A2, and DOWEX® UPCORE Mono A2.

Ion exchange resin used to reduce fluorosurfactant for use in the process is preferably monodisperse. Preferably, the ion exchange resin beads have a number average size distribution in which 95% of the beads have a diameter within plus or minus 100 μm of the number average bead diameter.

Concentration

If employed, concentration is preferably carried out using a method which provides a concentrated dispersion substantially free of nonionic surfactants. Nonionic surfactants, such as alkyl phenol ethoxylates or aliphatic alcohols ethoxylates, typically used for stabilization of fluoropolymer dispersions have a cloud point between about 30° C. and about 90° C. which enable concentration by a phase separation process such as that disclosed in U.S. Pat. No. 3,037,953 to Marks et al. Anionic polyelectrolyte dispersing agents, on the other hand, typically have no significant cloud point between about 30° C. and about 90° C. Therefore, other methods are preferably used to provide the desired concentration which leaves the concentrated dispersion free of nonionic surfactants.

One preferred method for concentration employs acrylic polymers of high acid content as described in U.S. Pat. No. 5,272,186 to Jones. The concentrating is performed by adding acrylic polymer of acid content of 20% or more by weight to the reduced-fluorosurfactant dispersion in an amount of about 0.01 to about 1 wt % based on aqueous content of the dispersion and subjecting the dispersion to conditions causing the dispersion to separate into a lower phase high in fluoropolymer solids and an upper phase low in fluoropolymer solids and recovering the lower phase as concentrated reduced fluorosurfactant dispersion.

To carry out the preferred concentration process, U.S. Pat. No. 5,272,186 states that the pH of the dispersion should be adjusted to at least about 6. As discussed above, it is preferable for the pH of the dispersion to be at least about 9, more preferably at least 9.5 for effective stabilization by the preferred anionic polyelectrolyte dispersing agent so that adjustment usually will not be necessary. If pH adjustment is necessary, typically a base such as ammonium hydroxide is used. The acrylic polymer concentrating agent preferably used in concentration has an acid content of 20% or more by weight. Preferably, the acrylic polymer of high acid content has a weight-average molecular weight of about 50,000 to about 1,000,000, and is employed in an amount of about 0.01 wt % to about 0.5 wt % based on the weight of the aqueous portion of the dispersion, more preferably about 0.02 to about 0.4 wt %. In a preferred embodiment, the acrylic polymers have a molecular weight of about 200,000 to 1,000,000. In another preferred embodiment the acrylic polymer is added in amount of about 0.03 to about 0.2 wt % based on the weight of the aqueous portion of the dispersion. An especially preferred acrylic polymer of high acid content is polyacrylic acid.

After addition of the acrylic polymer having an acid content of 20% or more by weight, the dispersion is subjected to conditions which cause a phase separation to occur. Typically, this involves letting the dispersion stand at ambient condition, preferably without agitation. The phase separation forms a concentrated dispersion of typical solids content of about 35 wt % to about 70 wt %, preferably about 40 wt % to about 70 wt % and more preferably about 50 wt % to about 70 wt %, as a lower phase. The upper phase will have substantially lower solids, preferably less than about 1 wt %.

Another preferred method for concentration is electrodecantation. Concentration of solids by electrodecantation is achieved by electrophoretic migration of PTFE particles employing direct current potential which is applied from electrodes at either end of a container containing the dispersion. Negatively charged PTFE particles surrounded by anionic dispersing agent move in the applied field toward the anode. Semi-permeable membrane barriers are suspended vertically in the container between the electrodes and form concentrating cells and prevent the particles from contacting the anode. Concentrated dispersion moves downward along one face of the membrane and depleted dispersion moves upward on the other face. The concentrated dispersion being denser settles to the bottom of the container and can be drawn of at intervals. The supernatant liquid remains overhead.

Filled Fluoropolymer Bearing Manufacture

For use in bearing manufacture, the fluoropolymer dispersion preferably contains fluoropolymer particles having an average particle size of about 10 to about 400 nm and preferably has a solids content of about 25 to about 70 wt %, more preferably 30 to about 60 wt %. A metal salt or an acid is added to aqueous dispersions as described above which causes the anionic polyelectrolyte dispersing agent to become insoluble and the PTFE is coagulated due to the loss of stabilization. A small amount of non-ionic surfactant or a water immiscible organic, usually toluene, may be added to help wet the filler and control the viscosity of the resulting precipitate which is termed "mush". The end user adds a suitable bearing filler such as lead powder, molybdenum disulfide or other suitable filler for a bearing application, either prior to or after mush formation. The mush containing the filler is calendared onto metal strips and sintered. The sintered strip are then formed into a bearing. Filled fluoropolymer bearings, due to lubricating properties of the PTFE and/or fillers, can be used in dry un-lubricated form, i.e., without lubricating oil or grease.

Preferred metal salts for coagulation of the aqueous dispersion are aluminum salts, preferably aluminum nitrate and aluminum sulfate. If acids are used for coagulation, preferred acids are sulfuric, nitric and phosphoric acids. In preferred embodiments, the dispersion contains less than 100 ppm and less than 50 ppm fluorosurfactant based on the weight of the dispersion.

Aqueous dispersions stabilized with hydrophobic acrylic copolymer anionic polyelectrolytes described above, especially those sold under the trademarks TAMOL® 681, TAMOL® 2001, TAMOL® 165A and TAMOL® 731A by Rohm and Haas, are particularly suitable for forming mushes for filled fluoropolymer bearing manufacture.

Test Methods

Solids content of raw (as polymerized) fluoropolymer dispersion are determined gravimetrically by evaporating a weighed aliquot of dispersion to dryness, and weighing the dried solids. Solids content is stated in weight % based on combined weights of PTFE and water. Alternately solids content can be determined by using a hydrometer to determine the specific gravity of the dispersion and then by reference to a table relating specific gravity to solids content. (The table is constructed from an algebraic expression derived from the density of water and density of as polymerized PTFE.)

Number average dispersion particle size on raw dispersion is measured by photon correlation spectroscopy.

Standard specific gravity (SSG) of PTFE resin is measured by the method of ASTM D-4895. If a surfactant is present, it can be removed by the extraction procedure in ASTM-D-4441 prior to determining SSG by ASTM D-4895.

Surfactant and solids content of stabilized dispersion are determined gravimetrically by evaporating a small weighed aliquot of dispersion to dryness following in general ASTM D-4441 but using a time and temperature such that water but not the surfactant is evaporated. This sample is then heated at 380° C. to remove the surfactant and reweighed. Surfactant content is stated in wt % based on fluoropolymer solids.

Gel time is measured by the time it takes a dispersion to completely gel in a blender. 200 ml of dispersion is placed in a Waring commercial explosion resistant blender (Model 707SB, one quart size, run at high speed, air requirements— 10 scfm@10 psi, available from Waring of New Hartford, Conn.). This blender has a capacity of 1 liter and has an air purge for the motor. The dispersion is stirred at the highest speed until the dispersion gels. The gel point is quite sharp and easy to determine. The Gel Time is recorded is seconds. If the dispersion does not gel in ½ hour (1800 seconds), the test is terminated to avoid damage to the blender. The blender is then completely disassembled and cleaned after each determination.

Fluorosurfactant Content is measured by a GC technique in which the fluorosurfactant is esterified with acidic methanol. Perfluoroheptanoic acid is used as an internal standard. Upon addition of electrolyte and hexane the ester is extracted into the upper hexane layer. The hexane layer is analyzed by injection onto a glass GC column of 20 ft.×2 mm I.D. packed with 10% OV-210 on 70/80 mesh Chromosorb W.AW.D-MCS. held at 120 C. The detector is ECD and the carrier gas of 95% argon/5% methane has a flow rate of 20 to 30 ml/min.

EXAMPLES

Fluoropolymers

TFE is polymerized to produce a raw PTFE homopolymer dispersion containing PTFE particles having an SSG of about 2.20 and a number average particle size of approximately 220 nm. The raw as-polymerized dispersion contains approximately 45% fluoropolymer solids and has an APFO content of about 1800 ppm. In order to determine Gel Times, raw as-polymerized dispersion is used as described in the examples below.

Dispersing Agents

TAMOL® 681 supplied by Rohm and Haas is the ammonium salt of a copolymer containing about 39% methacrylic acid and about 61% butyl methacrylate with a molecular weight of approximately 10,000. The dispersing agent is received as a very viscous liquid in water having a viscosity of 9700 cps and contains 35% active ingredients. The copolymer is described as being hydrophobic.

TAMOL® 2001 supplied by Rohm and Haas is the sodium salt of a same as TAMOL® 681. The dispersing agent is received as milky white liquid in propylene glycol having a viscosity of 20 cps with a pH of 3.4 and contains 42% active ingredients. For effective use, ammonium hydroxide is added to form an ionized salt. Adding ammonium hydroxide to Tamol 2001 results in a very high viscosity, approximately 38,000 cps. If the Tamol is diluted to 20% or lower, the viscosity is less than 40 cps when ammonium hydroxide is added. Alternatively the Tamol can be mixed into the dispersion and then ammonium hydroxide can be added.

TAMOL® 165A—Hydrophobic acrylic copolymer. TAMOL® 165A has a viscosity of 660 cps. This grades contains 21% active ingredients.

TAMOL® 731A—Hydrophobic acrylic copolymer. The TAMOL® 731A has a viscosity of 56 cps and contains 25% active ingredients.

TAMOL® 1124—Hydrophillic acrylic copolymer containing 50% active ingredients.

TAMOL® 963—A poly-acid dispersant containing 35% active ingredients.

Ion Exchange Resin

A244-OH by US Filter is commercially-available strong base anion exchange resin with quaternary ammonium groups with a dimethyl ethanol amine moiety in hydroxide form.

Example 1

Several samples of 200 grams of as-polymerized (raw) PTFE dispersion at 41 wt % solids are placed in 8-ounce glass jars. The jars are approximately ¾ full.

Sample 1 contains only as-polymerized PTFE dispersion.

Sample 2 contains as-polymerized PTFE dispersion stabilized with 1.22 wt % TAMOL® 681 (active ingredient basis) based on the dry weight of PTFE.

Sample 3 contains as-polymerized PTFE dispersion with 6 wt % of wet US Filter A-244-OH ion exchange resin Sample 4 contains as-polymerized PTFE dispersion stabilized with 1.22 wt % TAMOL® 681 based on the dry weight of PTFE and 6 wt % of wet US Filter A-244-OH ion exchange resin.

The jars are placed on a Brunnell Wrist Action Shaker and shaken on a speed setting of 1 at room temperature, a suitable setting to get good mixing of the ion exchange resin and PTFE dispersion in Samples 3 and 4.

Sample 1 containing only PTFE dispersion is ⅔ coagulated after shaking for about 1.5 hours.

Sample 2 containing 1.22 wt % TAMBL® 681 based on the dry weight of PTFE is unchanged visually after 2 hours of shaking indicating that the TAMOL® 681 provided a degree of shear stability.

Sample 3 containing ion exchange resin shows immediate clumping as soon as ion exchange resin is added. After shaking one hour, the pH rose from 3.5 to 4.1 and the conductivity fell from 1685 microsiemens per cm to 183 indicating that APFO removal is taking place. After two hours the PTFE is completely coagulated and the ion exchange resin is encapsulated by the PTFE gel.

Sample 4 containing 3.5% TAMOL® 681 and 6 wt % A-244-OH ion exchange resin is visually unchanged after two hours of shaking, i.e. no coagulation is present and the ion exchange resin still floated on the surface of the dispersion. The pH rose and the conductivity fell indicating that some APFO removal had occurred.

Example 2

Shear Stability as Measured by Gel Time

To establish an effective level of TAMOL® 681, samples of as-polymerized PTFE dispersion and TAMOL® 681 are sheared in a Waring blender at high speed until the dispersion gelled. The resulting Gel Times are shown below in Table 1. The shear stability is found to be highly dependent on concentration of TAMOL®. The wt % Tamol 681 is expressed on the basis of active ingredients relative to PTFE solids.

TABLE 1

| wt % TAMOL® 681 | Gel Time, seconds |
|---|---|
| 0.35 | 2 |
| 0.70 | 4 |
| 1.05 | 3 |
| 1.49 | 43 |
| 1.75 | 727 |

Example 3

Fluorosurfactant Removal

A dispersion containing 1.75 wt % TAMOL® 681 (active ingredients basis) in as-polymerized PTFE with 41 wt % solids is prepared. Additional ammonium hydroxide is added to insure the pH remains above 9.5. Varying level of A-244-OH ion exchange resin are added and the samples are shaken on the Brunnell Wrist Action Shaker at a speed setting of 1 for 3 hours. The samples are then analyzed for APFO levels based on the total dispersion weight. The results are shown below.

TABLE 2

| wt % A-244-OH Resin | APFO, ppm |
|---|---|
| 1.2 | 879 |
| 3.5 | 434 |
| 5.8 | 232 |
| 8.1 | 149 |
| 10.5 | 99.8 |
| 12.8 | 64 |

The results indicate that the TAMOL® 681 provides sufficient stability to allow ion exchange to reduce the level of APFO in fluoropolymer dispersions. It is also a good indication that the ion exchange resin is not removing the TAMOL® as well as the APFO.

The rate of ion exchange can be further improved by using additional ion exchange resin or by increasing the temperature at which the ion exchange is conducted.

Example 4

Alternate grades of TAMOL® are tested for shear stability in as-polymerized PTFE dispersion with APFO present. As will be seen below, hydrophobic acrylic copolymers exhibit good shear stability where hydrophilic acrylic copolymers do not. Tests are conducted to determine the minimum amount of the different grades to give adequate shear stability as shown in the Table below. As shown below, hydrophobic copolymer dispersing agents exhibit desirable shear stability whereas the hydrophilic copolymer dispersing agents and poly-acid grade do not.

TABLE 3

Gel Times with Different Grades of TAMOL®

| TAMOL® Type | wt % TAMOL® Active Ingred.* | Gel Time, sec | Description |
|---|---|---|---|
| T-2001 | 1.79 | 385 | Hydrophobic |
| T-2001 | 3.19 | 1042 | Hydrophobic |
| T-165A | 2.43 | >1800 | Hydrophobic |
| T-165A | 1.77 | >1800 | Hydrophobic |
| T-165A | 1.46 | 430 | Hydrophobic |
| T-731A | 2.43 | >1800 | Hydrophobic |
| T-731A | 1.76 | 509 | Hydrophobic |
| T-1124 | 3.19 | 2 | Hydrophilic |
| T-1124 | 6.38 | 2 | Hydrophilic |
| T-963 | 3.19 | 0 | poly acid, PTFE gelled when added |

*Based on PTFE

Example 5

This example illustrates reduction of fluorosurfactant-containing fluoropolymer dispersion containing acrylic copolymer dispersing agents in an anion exchange column and subsequent concentration using acrylic polymer of high acid content.

100 parts of as-polymerized PTFE (43.5 wt % solids) is mixed with 1.74 parts TAMOL® 2001 (active ingredients basis). The dispersion is gently stirred and ammonium hydroxide is added to bring the pH up to 9.8. The dispersion is passed through a column containing US Filter A-244 OH ion exchange resin. The column is 14 inches in diameter and has a length to diameter ratio of 8:1. The temperature of the dispersion is maintained at 52-54° C. The flow rate through the column is approximately 10 pounds per minute. This results in a reduction of the APFO level from 1600 ppm to 8.1 ppm.

After ion exchange, the solids level is measured at 41.2 wt %. A solution of polyacrylic acid (PAA) is prepared to concentrate the dispersion. 42.7 grams of Aquatreat AR-7H (available from Alco Chemicals as a 15% solution) are added to 157.3 grams water. Ammonium hydroxide is added to raise the pH to 9.5 to convert the PAA to the ammonium salt (raising the viscosity of the stock solution from 13 cps to 238 cps) causing the PAA the be added to the dispersion in salt form. If added in the acidic form, the PAA will lower the pH of the dispersion and the TAMOL® will become insoluble resulting in localized coagulation of the PTFE dispersion.

37.2 grams of the PAA stock solution is added to 2058 grams of the TAMOL® stabilized dispersion that has been subjected to the ion exchange process. The mixture is heated to 75° C. with stirring and the stirrer is then turned off to allow concentration to occur. After one hour, the upper layer is removed. The concentrated lower layer contains 66.0% PTFE solids. The viscosity of the dispersion is 318 cps.

The concentrated dispersion is diluted to 60.0% solids with demineralized water. This reduces the viscosity to 84 cps. 2.4% sodium lauryl sulfate is added based on PTFE solids to improve wetting characteristics, reducing the viscosity further to 33 cps.

Example 6

This example illustrates reduction of fluorosurfactant-containing fluoropolymer dispersion containing acrylic copolymer dispersing agents in an anion exchange column and subsequent concentration using electrodecantation.

Similar to Example 5, 100 parts of as-polymerized PTFE (43.5 wt % solids) is mixed with 1.74 parts TAMOL® 2001 (active ingredients basis). The dispersion is gently stirred and ammonium hydroxide is added to bring the pH up to 9.8. The dispersion is passed through a column containing US Filter A-244 OH ion exchange resin. The column is 14 inches in diameter and has a length to diameter ratio of 8:1. The temperature of the dispersion is maintained at 52-54° C. The flow rate through the column is approximately 10 pounds per minute. This results in a reduction of the APFO level from 1600 ppm to 8.1 ppm.

After ion exchange, the solids level is measured at 41.2 wt %. Concentration of solids is performed by electrodecantation. The dispersion is fed to a container and a direct current potential is applied from electrodes at either end of the container (240 V d.c.). Negatively charged PTFE particles surrounded by anionic dispersing agent move in the applied field toward the anode. A plurality of semi permeable membrane barriers suspended vertically in the container between the electrodes form concentrating cells and prevent the particles from contacting the anode. Concentrated dispersion moves downward along one face of a membrane and depleted dispersion moves upward on the other face. Periodic current reversal prevents compaction and coagulation of the resin particles. The concentrated dispersion being denser settles to the sloping bottom of the container which is not separated into concentrating cells. The concentrated dispersion is withdrawn form the bottom of the decanter in 30 minute intervals. The supernatant liquid remains overhead. The applied current is alternated every 90 seconds to reverse the flow of the PTFE particles thus preventing coagulation of PTFE powder on the membranes and electrodes. The concentrated lower layer contains 54.0% PTFE solids. The viscosity of the dispersion is approximately 30 cps.

Example 7

This example illustrates a process in accordance with the invention for making filled fluoropolymer bearings. Bearings of this type can be used in dry un-lubricated form, i.e., without lubricating oil or grease, due to the lubricating properties of the PTFE and/or fillers employed in the product.

Similar to Example 5, 100 parts of as-polymerized PTFE (43.5 wt % solids) is mixed with 1.74 parts TAMOL® 2001 (active ingredients basis). The dispersion is gently stirred and ammonium hydroxide is added to bring the pH up to 9.8. The dispersion is passed through a column containing US Filter A-244 OH ion exchange resin. The column is 14 inches in diameter and has a length to diameter ratio of 8:1. The temperature of the dispersion is maintained at 52-54° C. The flow rate through the column is approximately 10 pounds per minute. This results in a reduction of the APFO level from 1600 ppm to 8.1 ppm. After ion exchange, the solids level is measured at 41.2 wt %. The dispersion is diluted to 30 wt % solids.

Without concentration of the dispersion, a mixture is prepared by placing a 100 grams of PTFE dispersion in a container to which is added 0.7 grams of 25% Triton X-100 in water and swirled into solution. Subsequently, 10 grams of toluene is added and swirled for 1 minute followed by the addition of 0.8 grams $Al(NO_3)_3 \cdot 9 H_2O$ which is swirled for 30 seconds and results in coagulation of the PTFE dispersion. The mixture is allowed to stand for 30 minutes after which the water is decanted. Toluene can be used to adjust the viscosity.

In a separate container, 60 grams water, 60 grams powdered lead (i.e. bearing filler) and 2 drops of 25% Triton X-100 in water are added and stirred with a spatula. The two mixtures are combined by rolling and decanting any excess water to form a mush containing the powdered lead filler.

The mush can be used immediately or allowed to age overnight. Care must be taken to avoid loss of toluene which would increase the viscosity. Excessive handling of the mush will increase the viscosity due to fibrillation.

It is noted that only small amounts of nonionic surfactant are used in the mush formation process. Such quantities are sufficient to wet the filler particles for incorporation.

The mush is calendared onto metal strips approximately 8-12 inches (8-30 cm) wide consisting of a steel backing sheet bonded to a porous bronze sintered layer. The PTFE mush penetrates the porous metal matrix forming a PTFE-based polymer bearing material generally having a total thickness of from 1-2 mm, the porous bronze layer with PTFE impregnation being approximately 200 micrometers thick after sintering at temperatures in the range of 350° C. to 420° C.

What is claimed is:

1. A process for making a filled fluoropolymer bearing comprising:
providing an aqueous fluoropolymer dispersion comprising fluoropolymer particles and anionic polyelectrolyte dispersing agent in an amount sufficient for stabilization, said dispersion being substantially free of nonionic surfactant and containing less than about 300 ppm fluorosurfactant based on the weight of said dispersion;

coagulating said dispersion to make a mush;

adding bearing filler to said dispersion prior to or after making said mush;

applying said mush containing bearing filler onto a bearing substrate to produce a coated substrate;

sintering said coated substrate; and forming said coated substrate into a bearing.

2. The process of claim 1 where said coagulating of said dispersion to make a mush comprises adding metal salt or acid to said dispersion.

3. The process of claim 1 wherein said dispersion contains less than about 100 ppm fluorosurfactant based on the weight of said dispersion.

4. The process of claim 1 wherein said dispersion contains less than about 50 ppm fluorosurfactant based on the weight of said dispersion.

5. The process of claim 1 wherein said aqueous fluoropolymer dispersion comprises fluoropolymer particles having an average particle size of about 10 to about 400 nm and said dispersion has a solids content of about 25 to about 70 wt %.

6. The process of claim 1 wherein said dispersion comprises about 0.03 wt % to about 10 wt % anionic polyelectrolyte dispersing agent based on the weight of fluoropolymer solids.

7. The process of claim 1 wherein the anionic polyelectrolyte dispersing agent is an anionic polymer, having a linear or branched structure, with anionic groups distributed along the polymeric chain.

8. The process of claim 1 wherein the anionic polyelectrolyte dispersing agent has an equivalent weight greater than about 150.

9. The process of claim 1 wherein the equivalent weight of the anionic polyelectrolyte dispersing agent is less than about 50,000.

10. The process of claim 1 wherein the number average molecular weight of the anionic polyelectrolyte dispersing agent is equal to or greater than about 500.

11. The process of claim 1 wherein the anionic polyelectrolyte dispersing agent contains at least 2 anionic functional groups per molecule.

12. The process of claim 1 wherein the anionic polyelectrolyte dispersing agent contains anionic functional groups selected from carboxylates, sulphates, sulphonates, phosphates, and phosphonates.

13. The process of claim 1, wherein the anionic polyelectrolyte dispersing agent does not contain fluorine atoms.

14. The process of claim 1, wherein the anionic polyelectrolytes are selected from anionic homopolymers and copolymers of monomers selected from acrylic and vinyl monomers.

15. The process of claim 14 wherein the acrylic monomers are selected from (meth)acrylamide, salts of (meth)acrylic acid, (meth)acrylonitrile, linear or branched $C_1$-$C_4$ hydroxyesters of the (meth)acrylic acid, $C_1$-$C_{12}$ alkyl(meth)acrylates, wherein the alkyl can be linear or branched, and compounds of the following general formula:

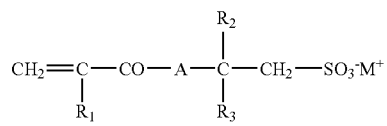

wherein: $R_1$ is H or $CH_3$; $R_2$ and $R_3$, equal or different, are H or $C_1$-$C_8$ alkyl, optionally branched; M is an alkaline or alkaline-earth metal or ammonium and A is NH, O or $NCH_3$.

16. The process of claim 1 wherein said anionic polyelectrolyte dispersing agent is an acrylic copolymer.

17. The process of claim 16 wherein said acrylic copolymer dispersing agent has a molecular weight of about 2,000 to about 100,000.

18. The process of claim 16 wherein said acrylic copolymer dispersing agent has a molecular weight of about 5,000 to about 20,000.

19. The process of claim 16 wherein said acrylic copolymer dispersing agent is hydrophobic.

20. The process of claim 16 wherein said acrylic copolymer dispersing agent comprises methacrylic acid/butyl methacrylate copolymer.

21. The process of claim 20 wherein said methacrylic acid/butyl methacrylate copolymer comprises about 30 to about 50 mol % methacrylic acid units and about 50 to about 70 mol % butyl methacrylate units.

* * * * *